US012497192B2

(12) United States Patent
Nees et al.

(10) Patent No.: US 12,497,192 B2
(45) Date of Patent: Dec. 16, 2025

(54) POWER SUPPLY SYSTEM FOR AN AIRCRAFT SERVICE PIT

(71) Applicant: Dabico Airport Solutions Germany GmbH, Dietzenbach (DE)

(72) Inventors: Michael Nees, Kahl (DE); Albrecht Bathon, Hösbach (DE)

(73) Assignee: DABICO AIRPORT SOLUTIONS GERMANY GmbH, Dietzenbach (DE)

( * ) Notice: Subject to any disclaimer, the term of this patent is extended or adjusted under 35 U.S.C. 154(b) by 172 days.

(21) Appl. No.: 18/318,346

(22) Filed: May 16, 2023

(65) Prior Publication Data

US 2023/0365373 A1 Nov. 16, 2023

(30) Foreign Application Priority Data

May 16, 2022 (EP) ..................................... 22173619

(51) Int. Cl.
*B64F 1/36* (2024.01)
*B64F 1/00* (2024.01)
(Continued)

(52) U.S. Cl.
CPC .................. *B64F 1/36* (2013.01); *B64F 1/00* (2013.01); *B64F 1/35* (2024.01); *B65H 51/06* (2013.01);
(Continued)

(58) Field of Classification Search
CPC .......... H02G 1/001; H02G 11/02; H02G 9/10; B64D 41/00; B64F 1/00; B64F 1/35;
(Continued)

(56) References Cited

U.S. PATENT DOCUMENTS 2,159,250 A * 5/1939 Brantly ................. E21B 19/008
254/358
4,214,431 A * 7/1980 Bruce .................... B65H 49/20
57/22
(Continued)

FOREIGN PATENT DOCUMENTS

EP 2 838 797 B1 8/2020
WO 2008/146110 A1 12/2008

OTHER PUBLICATIONS

Extended European Search Report dated Sep. 19, 2023 from corresponding EP patent application No. 23020224.4, 8 pages.
(Continued)

*Primary Examiner* — Timothy J Thompson
*Assistant Examiner* — Rhadames Alonzo Miller
(74) *Attorney, Agent, or Firm* — Ruggiero McAllister & McMahon LLC

(57) ABSTRACT

The present disclosure relates to a device for unstowing an electrical supply cable from a storage chamber disposed within an underground service pit. The cable is configured to electrically connect to an electrical power supply at a first end and to connect to an external power socket of an aircraft at a second end for supplying electrical power to the aircraft. The device includes a cable guiding wheel that is disposed at ground level above the underground service pit and configured to receive the cable. The device also includes a motor coupled to the cable guiding wheel that is configured to drive the cable guiding wheel. Upon activation, the motor rotates the cable guiding wheel to generate a pulling force on the cable to at least partially lift the cable out of the storage chamber.

14 Claims, 4 Drawing Sheets

(51) Int. Cl.
   *B64F 1/35* (2024.01)
   *B65H 51/06* (2006.01)
   *B65H 51/32* (2006.01)

(52) U.S. Cl.
   CPC ......... *B65H 51/32* (2013.01); *B65H 2403/92* (2013.01); *B65H 2701/34* (2013.01)

(58) Field of Classification Search
   CPC ... B64F 1/36; B65H 2403/92; B65H 2701/34; B65H 51/06; B65H 51/32
   See application file for complete search history.

(56) References Cited

U.S. PATENT DOCUMENTS

| | | | | |
|---|---|---|---|---|
| 4,470,553 | A * | 9/1984 | Boggs | B65H 54/00 |
| | | | | 242/414.1 |
| 4,692,569 | A | 9/1987 | Winner | |
| 4,825,986 | A * | 5/1989 | Pepper | H02G 11/02 |
| | | | | 191/12.2 A |
| 4,853,500 | A | 8/1989 | Tydlacka | |
| 4,923,135 | A | 5/1990 | Schabmüller | |
| 5,215,279 | A * | 6/1993 | Foit | B65H 75/14 |
| | | | | 242/603 |
| 5,279,469 | A * | 1/1994 | Foit | B65H 75/425 |
| | | | | 242/397.2 |
| 5,871,171 | A * | 2/1999 | Kenney | B65H 75/50 |
| | | | | 242/610.6 |
| 5,975,453 | A * | 11/1999 | Sakata | B60R 16/027 |
| | | | | 181/294 |
| 6,019,621 | A * | 2/2000 | Sugata | H01R 35/025 |
| | | | | 439/15 |
| 6,065,707 | A * | 5/2000 | Sakata | B65H 75/44 |
| | | | | 439/15 |
| 2002/0014551 | A1 * | 2/2002 | Tuttlebee | F16D 7/025 |
| | | | | 242/390.8 |
| 2002/0148873 | A1 * | 10/2002 | Fenjac | B65H 51/14 |
| | | | | 226/42 |
| 2002/0157375 | A1 * | 10/2002 | Moss | G02B 6/449 |
| | | | | 57/293 |
| 2008/0315030 | A1 * | 12/2008 | Hendrickson | G02B 6/475 |
| | | | | 242/565 |
| 2010/0171373 | A1 * | 7/2010 | Dahl | B64F 1/35 |
| | | | | 307/154 |
| 2016/0122154 | A1 * | 5/2016 | Walker | B65H 75/4473 |
| | | | | 242/405.1 |
| 2020/0041042 | A1 * | 2/2020 | Vaccaro | F16L 3/137 |
| 2020/0324661 | A1 * | 10/2020 | Freeling-Wilkinson | |
| | | | | B60L 53/305 |
| 2021/0296865 | A1 * | 9/2021 | Lee | H02G 1/02 |
| 2023/0134070 | A1 * | 5/2023 | Liu | F16D 69/025 |
| | | | | 523/149 |

OTHER PUBLICATIONS

New Zealand First Patent Examination Report dated Oct. 2, 2024 from corresponding New Zealand Patent Application No. 799936, 4 pages.

European Examination Report dated Apr. 10, 2025 from corresponding EP patent application No. 23020224.4, 6 pages.

New Zealand Second Patent Examination Report (Intention to Grant) dated Apr. 14, 2025 from corresponding New Zealand Patent Application No. 799936, 2 pages.

* cited by examiner

POWER SUPPLY SYSTEM FOR AN AIRCRAFT SERVICE PIT

CROSS REFERENCE TO RELATED APPLICATIONS

This application claims priority under 35 U.S.C. § 119 to European patent application EP22173619.2, filed May 16, 2022, the entirety of which is incorporated herein by reference.

BACKGROUND OF THE DISCLOSURE

1. Field of the Disclosure

The present technology relates to an electrical power supply system for use in an aircraft service pit to supply electrical power to an aircraft on the ground.

2. Description of Related Art

At airports and airfields throughout the world, aircraft ground support is generally provided from pits located beneath the surface across which the aircraft travel while on the ground. These pits provide subsurface terminations for aircraft servicing facilities such as fuel lines, electrical power supply lines, air conditioning ducts, and other auxiliary services which are provided to an aircraft that are on the ground. The use of subsurface pits serves to reduce the congestion of motorized vehicles and lines running across the aircraft servicing areas that would otherwise exist.

Aircraft servicing pits typically take the form of hollow enclosures that are buried in excavated holes dug beneath aircraft servicing areas. Fuel lines, electrical lines, air conditioning lines and other ground support auxiliary service lines are typically laid down during the construction of the airport or aircraft terminal in trenches that are eventually filled in. These lines run from the terminal facility to the aircraft servicing pits and are accessible at access points through aircraft servicing pit lid assemblies that are located at the top of the pits.

Electrical power supply systems are generally located in a terminal facility of the airport and the aircraft supply voltage is fed to the aircrafts often through long power cables extending from an electrical power supply to the respective aircraft servicing pits. Typically, the electrical power supply systems are driven by a 50 Hz or 60 Hz 3-phase input voltage and generates a desired 3-phase 400 Hz alternating output voltage or a 28 VDC voltage. Thus, long, complex and costly cables of high quality that can withstand the harsh environment of an airport are required for supplying the aircraft on the ground from a pit.

Conventionally, cables of an electrical power supply system are stowed in an underground chamber within the service pit, and when in use, an operator retrieves a cable from the underground chamber by manually pulling and lifting the cable up to ground level. The operation is difficult for the operator and time consuming and, as the cable is heavy, the operator risks injuries by performing the manual operation.

In view of the foregoing, it is desirable to provide an improved system for unstowing a cable from an electrical power supply system located in an underground service pit.

SUMMARY OF THE DISCLOSURE

An aspect of the present technology provides a device for unstowing an electrical supply cable from a storage chamber disposed within an underground service pit, the cable being configured to electrically connect to an electrical power supply at a first end and to connect to an external power socket of an aircraft at a second end for supplying electrical power to the aircraft, the device comprising: a cable guiding wheel disposed at ground level above the underground service pit configured to receive the cable; and a motor coupled to the cable guiding wheel configured to drive the cable guiding wheel, wherein, upon activation, the motor rotates the cable guiding wheel to generate a pulling force on the cable to at least partially lift the cable out of the storage chamber.

According to embodiments of the present technology, a motorised cable guiding wheel is provided at or above ground level of an underground service pit to receive an electrical supply cable stowed within a storage chamber in the underground service pit. When the cable is unstowed, the motor is activated and, being coupled to the cable guiding wheel, drives the rotation of the cable guiding wheel. The rotation of the cable guiding wheel exerts a pulling or lifting force on the cable in the direction which a human operator is pulling, such that the pulling force required from the human operator to unstow the cable, and therefore the load experienced by the operator, is reduced. Thus, the provision and configuration of the present device assist the human operator in unstowing the cable from the underground storage chamber. Since the cable guiding wheel is intended for implementation at ground level (not within the underground service pit), installation of the present device does not require modification of existing underground service pits and components therein, and as such complex operations and significant disruptions to normal operations of the airports can be avoided. In other words, the configuration of the present device allows it to be easily and straightforwardly implemented to existing service pits to assist in unstowing a cable with minimal disruptions and costs. Moreover, since the cable guiding wheel is provided at ground level, the complexity arising from maintenance of the present device is greatly reduced.

In some embodiments, an external circumferential surface of the cable guiding wheel may be substantially concave. The external circumferential surface of the cable guiding wheel may be any suitable and desirable shape. For example, the external circumferential surface (or cross section thereof) may be substantially flat, or it may be substantially rectangular or triangular. In preferred embodiments, the external circumferential surface may be concave or semi-circular, such that when the cable is placed onto the cable guiding wheel, the cable is urged towards the central circumferential axis of the cable guiding wheel with reduced lateral movements to ensure that the cable remains securely on the cable guiding wheel.

In some embodiments, the external circumferential surface of the cable guiding wheel may comprise a friction material to increase friction between the external circumferential surface and the cable. Provision of a friction material on the external circumferential surface of the cable guiding wheel increases the grip on the cable by the cable guiding wheel, thus increasing the amount of pulling force transferred onto the cable.

The friction material may be any suitable and desirable material. In some embodiments, the friction material may be rubber.

The friction material may be provided to the external circumferential surface of the cable guiding wheel using any suitable and desirable methods. In some embodiments, the friction material may be attached to the external circumferential surface by an adhesive.

The cable guiding wheel may be constructed in any suitable and desirable ways. For example, the cable guiding wheel may be constructed as a single piece, or it may be constructed from multiple pieces fitted or interlocked together. In some embodiments, the cable guiding wheel may comprise a first portion and a second portion, wherein the first portion and the second portion are configured for one to fit at least partially within the other to form the cable guiding wheel. For example, the first and second portions may each be a circular piece and the second portion may wholly or partially fit within the first portion. Alternative, the first and second portions may each be a semi-circular piece that fit together at each end to form a circular cable guiding wheel.

Any suitable motor may be used as desired. In some embodiments, the motor may be a brushless wheel hub motor. Use of a hub motor allows the motor to be fitted within the cable guiding wheel, thus allowing the present device to be more compact. Use of a brushless motor reduces the amount of wear and tear on the motor, thus reducing maintenance requirements.

In some embodiments, the motor may be a 12-500V and 10-2000 W motor. In a preferred embodiment, the motor may be a 24-48V and 200-1000 W motor.

In some embodiments, the storage chamber may be configured to stow the cable in a monospiral.

The motor may be configured to be activated in any suitable and desirable ways. In some embodiments, the motor may be configured to be activated by action of unstowing the cable. In these embodiments, the motor may be configured such that the action of a human operator pulling on the cable automatically activates the motor to assist with the unstowing.

In some embodiments, the motor may be configured to be activated by operation of an activation button.

In some embodiments, releasing the activation button may deactivate the motor.

In some embodiments, the motor may be configured to be reversible and reversing the motor assists in stowing the cable into the storage chamber. In alternative embodiments, the motor may be configured to allow rotation of the cable guiding wheel in both a forward direction and a backward direction, wherein the motor may be configured to rotate the cable guiding wheel in the forward direction upon activation to assist in unstowing the cable and to disengage to allow the cable guiding wheel to freely rotate in the backward direction to stow the cable into the storage chamber.

In another aspect, the present technology provides an electrical power supply system for an underground aircraft service pit, comprising: an electrical supply cable configured to electrically connect to an electrical power supply at a first end and to connect to an external power socket of an aircraft at a second end for supplying electrical power to the aircraft; a storage chamber disposed within the underground aircraft service pit configured to stow the electrical supply cable; a cable access point configured to allow access to the second end of the cable; and the device as described above.

In some embodiments, the cable access point may comprise a pop-up pit or a hatch pit.

In some embodiments, the device may be mounted onto the cable access point. Mounting the present device onto the cable access point provides easy access to the present device when the cable is to be unstowed.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments will now be described, with reference to the accompanying drawings, in which.

DETAILED DESCRIPTION OF THE DISCLOSURE

Figure 1:
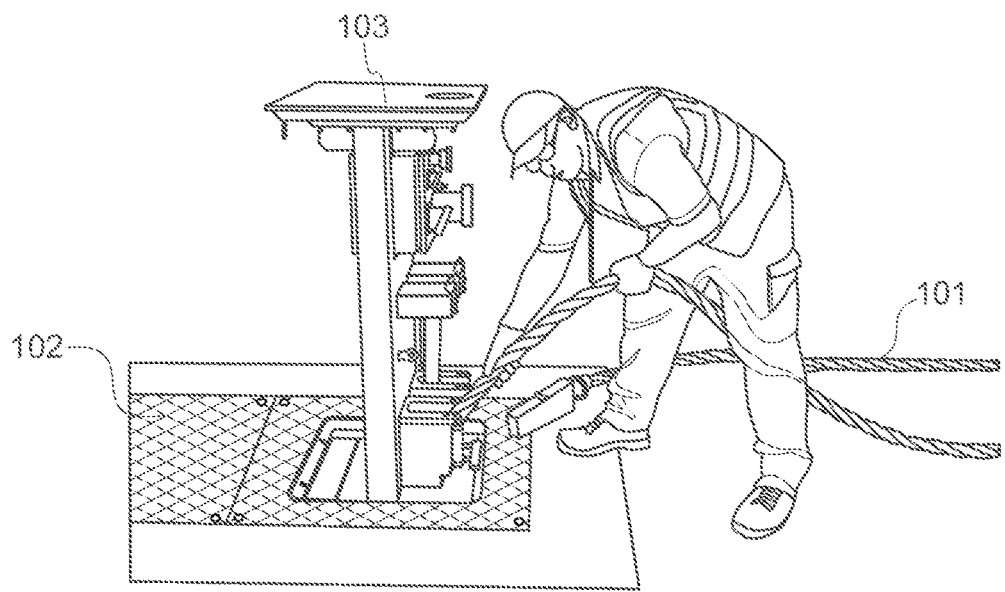
FIG. 1 shows a human operator unstowing an electrical supply cable from an underground service pit at an access point.
Figure 2:
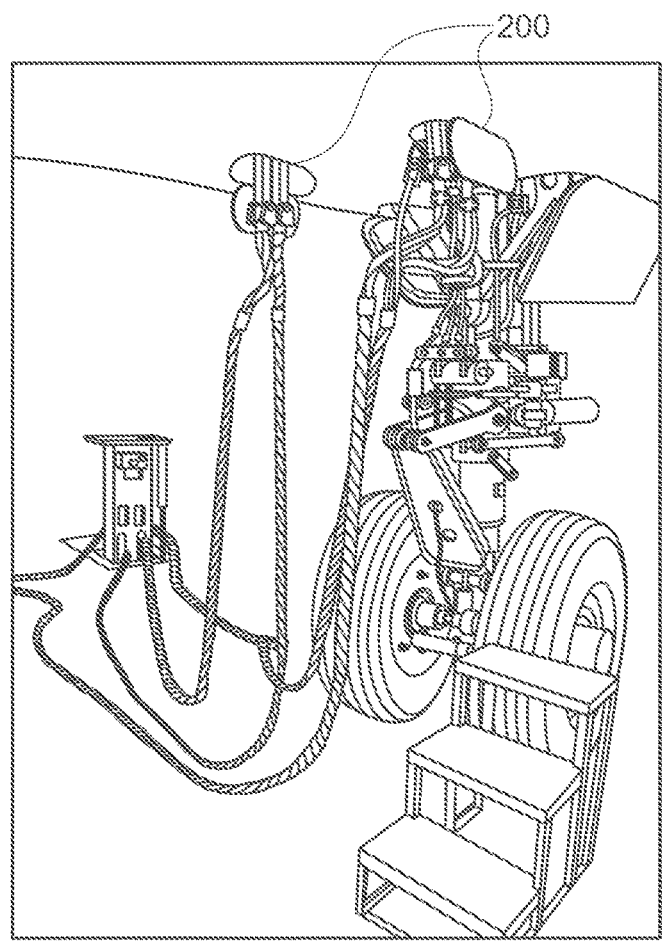
FIG. 2 shows various cables at an access point of a service pit connected to corresponding connection points of an aircraft.

Electrical power supply systems used for supplying electrical power to aircrafts are conventionally installed in underground service pits at airports. Cables of an electrical power supply system are stowed in a storage chamber within such underground service pits. FIG. 1 illustrates a human operator unstowing a cable 101 from an underground service pit 102 at a pop-up pit or station 103. When in use, the operator unstows the cable 101 from an underground storage chamber by manually pulling and lifting the cable 101 at an access point such as the pop-up pit 103 or a hatch pit up to ground level, and connect the cable to a corresponding connection point 200 such as an external power socket on an aircraft, as shown in FIG. 2. The unstowing operation is straining for the operator and time consuming since such cables are heavy and long, and the operator risks injuries by performing the manual operation.

The present technology thus provides a device for assisting with the unstowing of a cable from an underground service pit. Embodiments of the device comprises a cable guiding wheel and a motor coupled to the cable guiding wheel for driving the cable guiding wheel.

Figure 3:
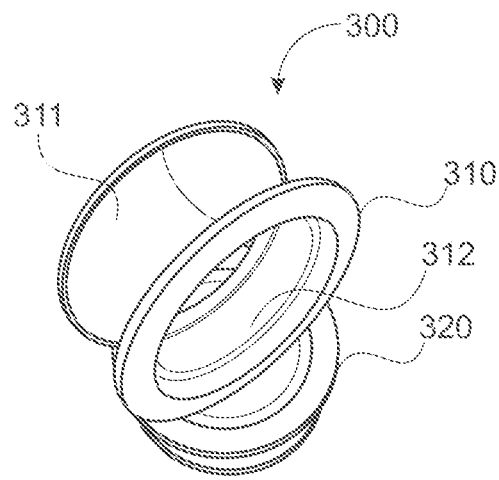
FIG. 3 shows an exemplary cable guiding wheel according to an embodiment.

FIG. 3 shows an exemplary cable guiding wheel 300 according to an embodiment. The cable guiding wheel 300 comprises a first portion 310 and a second portion 320. In the present embodiment, the first portion 310 and the second portion 320 are configured such that the second portion 320 is at least partially or completely inserted within the first portion 310, and the second portion 320 (partially or completely) fits within the first portion 310 to form the cable guiding wheel 300. The external circumferential surface 311 of the first portion 310 is partially shown. The external circumferential surface 311 is the surface that receives a cable and guide the motion of the cable as it is unstowed or stowed. As can be seen in FIG. 3, the external circumferential surface 311 is concave or semi-circular in cross-section. A concave external circumferential surface 311 urges a cable to remain substantially along the central circumferential axis of the cable guiding wheel and limits lateral movements of the cable as it is being stowed or unstowed. Other cross-sectional shape can also be used to provide the same or similar result, for example rectangular, triangular or a trough shape. The external circumferential surface 311 can be provided with a friction material, such as rubber, latex caoutchouc, neoprene, etc., partially or wholly covering the surface 311. For example, the friction material may cover a narrow continuous band around the entire circumference of the cable guiding wheel, cover multiple discrete sections around the circumference, across the entire width of the external circumferential surface 311 or across only a portion of the width of the external circumferential surface 311, etc. The friction material may be provided to the external circumferential surface 311 by adhering a strip of the friction material to the external circumferential surface 311 using a suitable adhesive. The internal circumferential surface 312 of the first portion 310 may be convex in correspondence with the concave shape of the external circumferential surface 311, or it may be flat or any other desirable shape. In an embodiment, the shape of the internal circumferential surface 312 of the first portion 310 may correspond to the shape of the external circumferential surface of the second portion 320, such that the second portion 320 fits within the first portion 310.

Figure 4:
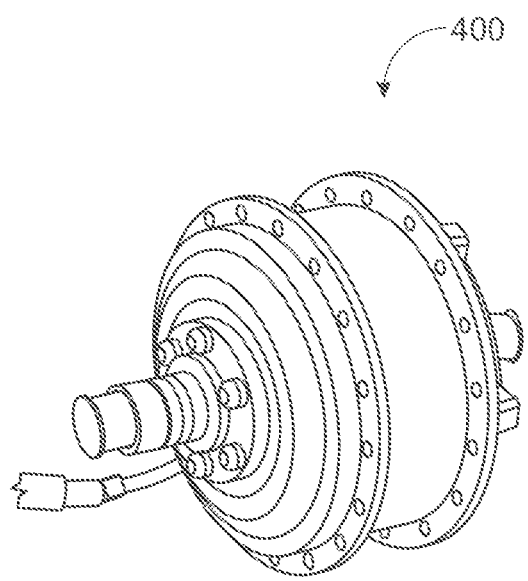
FIG. 4 shows an exemplary motor according to an embodiment.

FIG. 4 shows an exemplary motor 400 according to an embodiment. In the present embodiment, the motor 400 is a brushless wheel hub motor. The hub motor used in the present embodiment can be any suitable commercially available hub motor. The hub motor 400 is defined by a suitable range of parameters as desired, for example a voltage range of 12-500V, more specifically 24-48V, and a power range of 10-2000 W, more specifically 200-1000 W. In the present embodiment, the motor 400 is positioned in the centre of the cable guiding wheel 300.

Figures 5, 6:
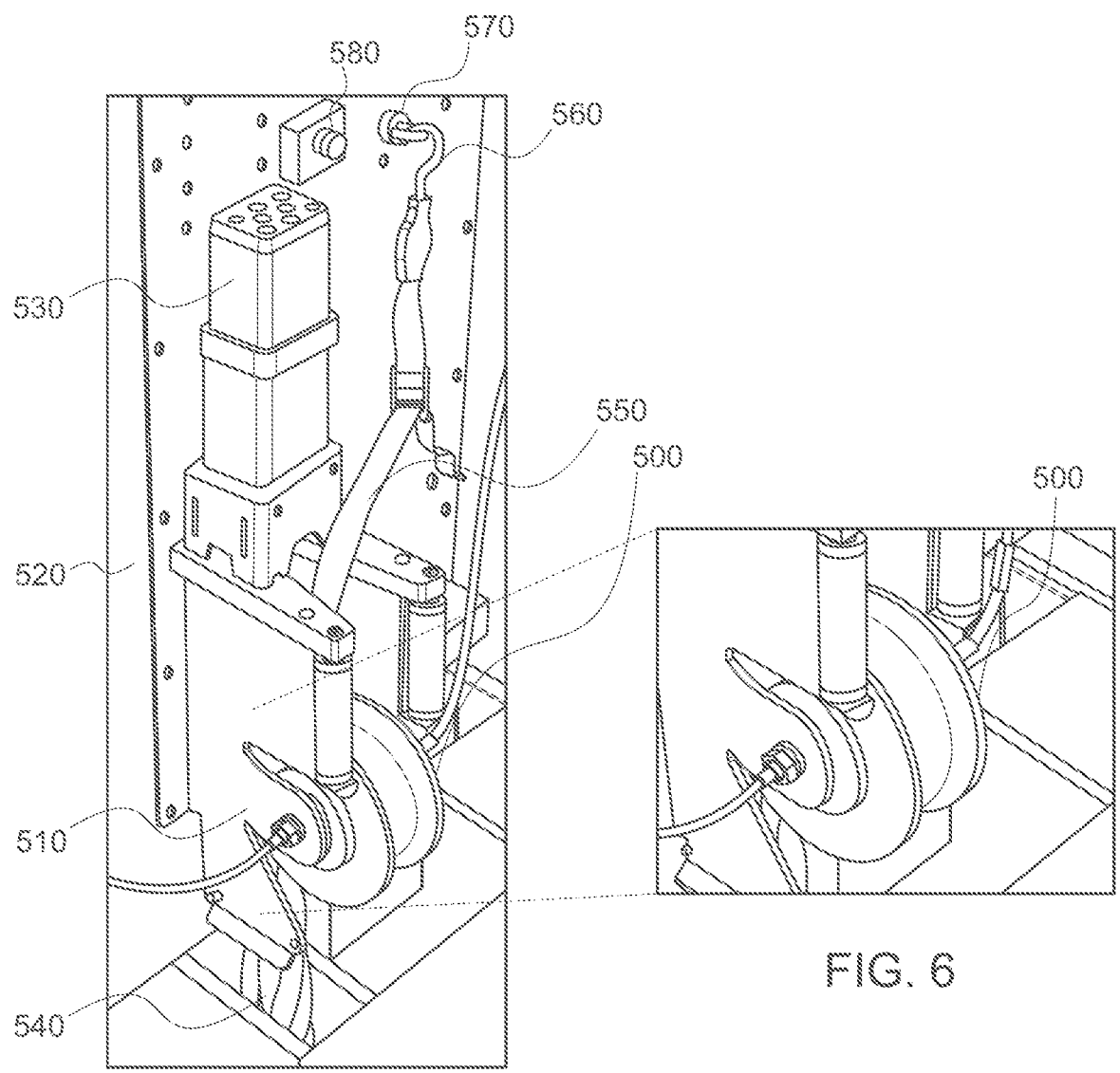
FIG. 5 shows an exemplary device according to an embodiment installed at an access point of a service pit.
FIG. 6 shows a close-up view of the device of FIG. 5.

FIG. 5 shows a device 500 according to an embodiment comprising the cable guiding wheel 300 and the motor 400 housed within the cable guiding wheel 300. The device 500 is mounted to an access point of an existing service pit in the form of a pop-up pit 520 by mounting 510. The mounting 510 further provides support for an electrical power connector 530 (which connects to a corresponding external socket of an aircraft) of an electrical power supply cable 540 to allow easy access of the cable 540 from the pop-up pit 520. The connector 530 and the cable 540 are further secured to the pop-up pit 520 by means of an adjustable strap 550 coupled (e.g. tied) to the cable 540 at one end and having a hook 560 at the other end, which hooks into a metal loop 570 attached (e.g. bolted) to the pop-up pit 520. In the present embodiment, the motor 400 is operated by a button 580. FIG. 6 shows a close-up view of the device 500.

Figure 7:
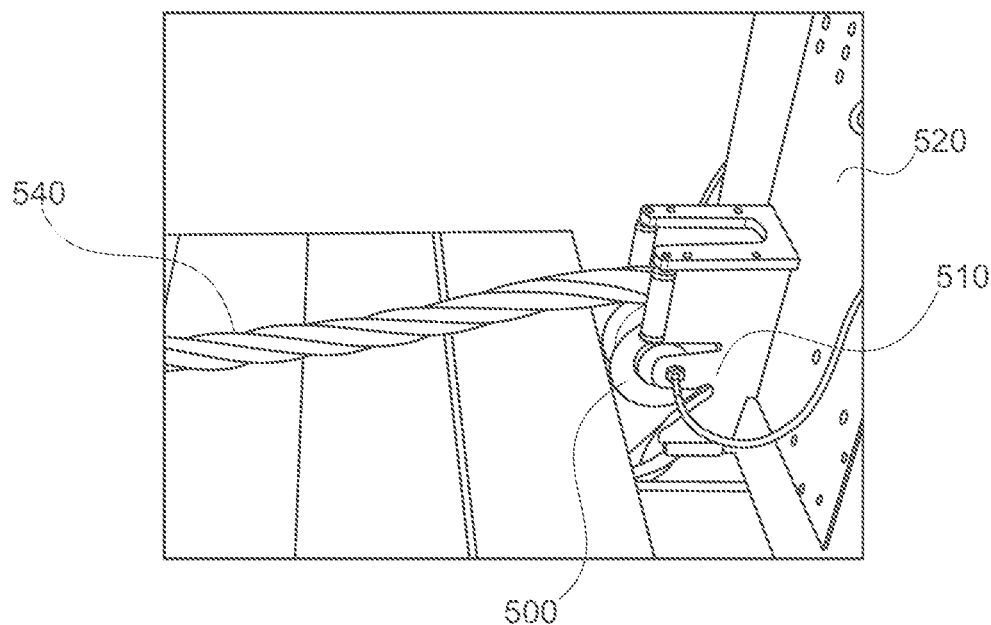
FIG. 7 shows a cable being unstowed assisted by the device of FIG. 5.

In use, the hook 560 of the strap 550 is unhooked from the loop 570 to release the cable 540 from the pop-up pit 520 and allow the connector 530 and cable 540 to be pulled away from the pop-up pit 520, as shown in FIG. 7. When unstowing the cable 540, the button 580 is operated (e.g. pressed down) to activate the motor 400. Upon activation, the motor 400 drives the cable guiding wheel 300 to rotate the cable guiding wheel 300 in a forward direction—the direction in which the cable 540 travels when being unstowed. The pulling action by the operator ensures contact between the cable 540 and the external circumferential surface of the cable guiding wheel 300. The friction material on the external circumferential surface of the cable guiding wheel 300 improves the efficiency of translating the forward rotation of the cable guiding wheel 300 into an upward motion or lift of the cable 540 from the underground service pit. The concave or semi-circular cross section of the external circumferential surface of the cable guiding wheel 300 reduces lateral movements of the cable 540 as it is being pulled up.

Figure 8:
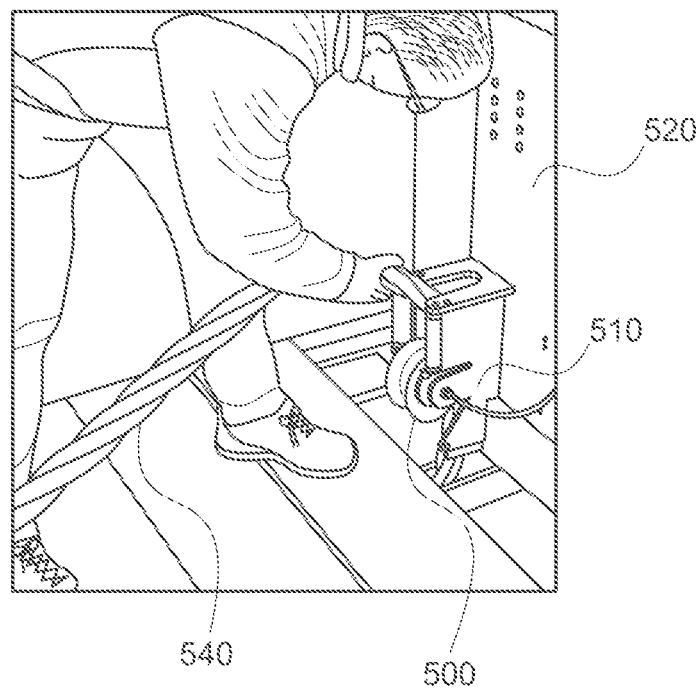
FIG. 8 shows a human operator unstowing a cable assisted by the device of FIG. 5.

FIG. 8 shows a human operator unstowing the cable 540 at the pop-up pit 520 assisted by the device 500. The motor 400 of the device 500, when activated, drives the forward rotation of the cable guiding wheel 300, which is translated into a pulling or lifting force on the cable 540 to at least partially drag or lift the cable 540 out of the service pit and towards the operator, thus reducing the load experienced by the operator when unstowing the cable 540.

In the embodiment above, the motor 400 is activated by pressing down the button 580. In some embodiments, pressing the button 580 again while the motor 400 is activated deactivates the motor 400.

In other embodiments, the motor 400 may be configured to be activated only when the button 580 is pressed and held down. In these embodiments, the motor 400 is deactivated when the button 580 is released.

In further embodiments, the button 580 may be replaced with a switch, a lever, a touch screen control, etc., as desired. In some embodiments, the button 580 may be disposed on the connector 530, such that an operator may activate the motor 400 by means of the button 580 while holding the connector 530.

In alternative embodiments, the motor 400 may be activated automatically when a human operator begins pulling the cable 540. For example, movement/rotation of the cable guiding wheel may be used as a trigger to activate the motor 400.

In some embodiments, the motor 400 is capable of driving the cable guiding wheel 300 in both a forward and a backward direction. In these embodiments, the motor 400 is activated to drive the cable guiding wheel 300 in the forward direction when unstowing the cable 540. When stowing the cable 540, the motor 400 is operated in reverse to drive the cable guiding wheel 300 in the backward direction to assist in stowing the cable into the storage chamber.

In alternative embodiments, the motor 400 may be configured to drive the cable guiding wheel 300 only in a forward direction, but may be configured to disengage to allow the cable guiding wheel 300 to rotate in a backward direction. In these embodiments, the motor 400 may be configured to drive the cable guiding wheel 300 to rotate in the forward direction upon activation when unstowing the cable 540. When stowing the cable 540, the motor 400 is disengaged to allow the cable guiding wheel 300 to rotate in the backward direction such that the cable is guided into the storage chamber.

The technology described herein provides assistance to a human operator when unstowing an electrical supply cable from an underground storage chamber through the provision of a motor driven cable guiding wheel. The cable guiding wheel, when driven by the motor, exerts a pulling force on the cable to at least partially lift the cable from the storage chamber, thus reducing the load experienced by the operator when retrieving the cable. Moreover, since the motor-driven guiding wheel is installed at ground level and configured to receive conventional electrical supply cable, the motor-driven guiding wheel can be retrospectively installed to existing electrical power supply systems already installed in airport underground service pits. As such, techniques described herein improves the efficiency of unstowing an electrical supply cable and improves the safety of the unstowing operation at low cost and with minimal disruptions to normal operations.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future.

It will be clear to one skilled in the art that many improvements and modifications can be made to the foregoing exemplary embodiments without departing from the scope of the present techniques.

What is claimed is:

1. An electrical power supply system for an underground service pit, comprising:
   an electrical supply cable configured to electrically connect to an electrical power supply at a first end and an external power socket of an aircraft at a second end so that electrical power can be supplied to the aircraft;
   a storage chamber disposed within the underground service pit configured to stow the electrical supply cable;
   a cable access point configured to allow access to the second end of the cable;
   a device for unstowing the electrical supply cable from the storage chamber;
   a cable guiding wheel of the device, the cable guiding wheel disposed at ground level above the underground service pit and configured to receive the cable; and
   a motor of the device, the motor coupled to the cable guiding wheel and configured to drive the cable guiding wheel,
   wherein, upon activation, the motor rotates the cable guiding wheel to generate a pulling force on the cable to at least partially lift the cable out of the storage chamber, and
   wherein the device is mounted to the cable access point.

2. The device system of claim 1, wherein the cable guiding wheel has an external circumferential surface that is substantially concave.

3. The system of claim 2, wherein the external circumferential surface of the cable guiding wheel comprises a friction material that increases friction between the external circumferential surface and the cable.

4. The system of claim 3, wherein the friction material is rubber, latex caoutchouc, neoprene, or a combination thereof.

5. The system of claim 3, wherein the friction material is attached to the external circumferential surface by an adhesive.

6. The system of claim 1, wherein the cable guiding wheel comprises a first portion and a second portion, wherein the first portion and the second portion are configured for one of the first portion or the second portion to fit at least partially within the other one of the first portion or the second portion to form the cable guiding wheel.

7. The system of claim 1, wherein the motor is a brushless wheel hub motor.

8. The system of claim 1, wherein the motor is a 12-500V and 10-2000 W motor.

9. The system of claim 1, wherein the storage chamber is configured to stow the cable in a monospiral.

10. The system of claim 1, wherein the motor is configured to be activated by an action of unstowing the cable.

11. The system of claim 1, wherein the motor is configured to be activated by operation of an activation button.

12. The system of claim 11, wherein the motor deactivates by releasing the activation button.

13. The system of claim 1, wherein the cable access point comprises a pop-up pit or a hatch pit.

14. The system of claim 1, wherein the device 1 is mounted to the cable access point by a mounting element.

* * * * *